(12) United States Patent
Alfani

(10) Patent No.: US 8,377,579 B2
(45) Date of Patent: Feb. 19, 2013

(54) COATINGS BASED ON HYDRAULIC BINDERS WITH AN OPTIMAL RHEOLOGY AND HIGH PHOTOCATALYTIC ACTIVITY

(75) Inventor: Roberta Alfani, Bergamo (IT)

(73) Assignee: Italcementi S.p.A., Bergamo (IT)

( * ) Notice: Subject to any disclaimer, the term of this patent is extended or adjusted under 35 U.S.C. 154(b) by 255 days.

(21) Appl. No.: 12/452,871

(22) PCT Filed: Jul. 24, 2008

(86) PCT No.: PCT/EP2008/059711
§ 371 (c)(1),
(2), (4) Date: Jan. 25, 2010

(87) PCT Pub. No.: WO2009/013337
PCT Pub. Date: Jan. 29, 2009

(65) Prior Publication Data
US 2010/0126845 A1     May 27, 2010

(30) Foreign Application Priority Data

Jul. 26, 2007 (IT) .............................. MI2007A1509

(51) Int. Cl.
*B32B 13/04* (2006.01)
*C04B 7/00* (2006.01)
*C04B 28/02* (2006.01)
*E01C 5/04* (2006.01)
*B05D 7/00* (2006.01)

(52) U.S. Cl. ........ 428/702; 428/323; 428/701; 106/713; 106/733; 106/819; 524/5

(58) Field of Classification Search ................... 428/702, 428/323, 701; 106/713, 733, 819; 524/5
See application file for complete search history.

(56) References Cited

U.S. PATENT DOCUMENTS

| 6,117,229 | A | * | 9/2000 | Cassar et al. | ................... 106/724 |
| 2007/0017417 | A1 | * | 1/2007 | Terruzzi | ....................... 106/622 |
| 2007/0169669 | A1 | * | 7/2007 | Costa et al. | ................... 106/714 |

FOREIGN PATENT DOCUMENTS

| EP | 0 885 857 A1 | 12/1998 |
| EP | 1 524 249 A1 | 4/2005 |
| EP | 1 652 827 A1 | 5/2006 |
| EP | 1 752 429 A1 | 2/2007 |
| WO | WO 98/05601 | 2/1998 |
| WO | WO 9955634 A1 * | 11/1999 |
| WO | WO 2004/074202 A1 | 9/2004 |

* cited by examiner

*Primary Examiner* — Michael M Bernshteyn
(74) *Attorney, Agent, or Firm* — Abelman, Frayne & Schwab

(57) ABSTRACT

There is described a cement composition, based on hydraulic binders, adapted to obtain coatings with a high photocatalytic activity and improved rheologic characteristics, including a hydraulic binder, a polycarboxylic or acrylic superfluidifying agent, a cellulosic ether with a viscosity in the range between 10000 and 120000 mPa·s, an adhesive agent, a calcareous, silicic or silicic-calcareous filler and a photocatalyst.

7 Claims, No Drawings

COATINGS BASED ON HYDRAULIC BINDERS WITH AN OPTIMAL RHEOLOGY AND HIGH PHOTOCATALYTIC ACTIVITY

FIELD OF THE INVENTION

The present invention relates to the field of photocatalytic cement compositions, specifically those applicable in the form of a fluid mixture on the surface of various substrates such as coatings for the degradation of pollutants, the decontamination of the environment, and the prolonged retention of the superficial appearance in the course of time.

STATE OF THE ART

Photocatalytic coating compositions, which may be applied to various substrates in order to improve the preservability and the constancy of surface color and/or reduce the charge of environmental pollutants have long been known. The photocatalytic layer applied to the surfaces may oxidize and/or decompose a variety of pollutants present in the environment in gaseous or microparticulate form, for instance N-oxides, polycondensed aromatic hydrocarbons, benzene, etc.; photocatalysis converts the above said pollutants into simpler particles, which are non volatile and may easily be washed away, thus preventing their further propagation in the atmosphere, as well as restraining the contaminant action thereof on the treated surface. Some of these compositions are for instance known from EP-A-633064, U.S. Pat. No. 4,530, 954, etc. Some have been produced in the form of paint that may be applied with rollers, others have been produced in a more viscous form that may be applied with a spatula and/or a plastering trowel. The latter have a better covering function and also allow to cover up a possible unevenness in the surface of the substrate thus improving the uniformity of the coated surface. The compositions in the form of paint are extremely fluid, and may therefore be applied rapidly; however, they have a poor leveling power and, when applied in a thick layer, they tend to deform and/or drip after being applied, under the action of the force of gravity; instead, the compositions which may be leveled out (also designated as "renders" and "plasters") have a good covering power although they display a higher viscosity and therefore require a greater effort for application. The two features may not be easily integrated.

Patent application EP-A-8856857 to the Applicant discloses cement compositions featuring a high adhesiveness and a good spreadability and containing a melamine resin, a polymer plasticizer, a modified starch and other ingredients. Among their features, these compositions have shown to be extremely fluid when applied; once applied they display a considerable consistency and stability, with a good leveling effect of the treated surfaces, without deformations or dripping. The drawback with the compositions disclosed in EP 885 857 is that they require an elaborate mixture of ingredients, some of which are particularly expensive; furthermore, the photocatalytic activity, even though considerable, is still not completely satisfactory.

The Applicant has studied new compositions featuring an optimal rheology and displaying a lower cost and an improved photocatalytic activity.

SUMMARY

A new photocatalytic composition meeting the above mentioned objects has now surprisingly been found. Such a composition is characterized in that it includes:

(a) a hydraulic binder
(b) a polycarboxylic or acrylic superplasticizer
(c) a cellulosic ether with a viscosity in the range between 10000 and 120000 mPa·s.
(d) an adhesive agent
(e) a calcareous, silicic or silicic-calcareous filler
(f) a photocatalyst.

It has indeed been found that these compositions display an application fluidity such as to allow the rapid and effortless treatment of broad surfaces; once applied, the same compositions do not drip or deform, but instead adhere to the applied substrate up to consolidation by drying. Furthermore, their photocatalytic activity has resulted extremely high, in spite of the use of low percentages of photocatalyst.

DETAILED DESCRIPTION OF THE INVENTION

Component (a): "hydraulic binder" indicates a hydraulic cement material in the form of dry powder which provides plastic mixtures capable of consolidating and hardening once the dry powder has been mixed with water. The definition includes cements as defined by the UNI ENV 197.1 standard (white, gray or pigmented), cement agglomerates, hydraulic limes as defined by law IT 595 (May 26, 1965), and mixtures thereof.

Component (b): the acrylic/polycarboxylic superfluidifying agents used as component (b) meet the requirements defined by the UNI EN 934-2 standard. These substances are normally used to reduce the water/cement ratio and improve the impermeability and the resistance of the cement compositions. Any polysaccharidic or acrylic superfuidifying agent may be used in the present invention. Examples of these superfluidifying agents that are currently available are the products from the Cimfluid Adagio® (Axim), Melflux® (Degussa), or Driver® (Axim) line.

Component (c): any cellulosic ether with a viscosity between 10000 and 120000 mPa·s may be used in the present invention. In the present disclosure, "viscosity" indicates Brookfield viscosity, measured in a 2% solution at 20° C. Preferably, the range of viscosity is between 20000 and 90000 mPa·s. Currently available cellulosic ethers in the ranges defined above are for instance methylhydroxymethylcellulose (Culminal®, Walocel®, Tylose®); other examples are ethylcellulose, hydroxypropyl-cellulose, hydroxypropylmethylcellulose, methylcellulose, carboxymethyl-cellulose, methylcarboxyethylcellulose, etc.

Component (d): adhesive agents are commonly known and used in the field of the invention. They generally consist of vinyl or acrylic polymers (e.g. polyvinylacetate, polyvinylversatate, polybutylacrylate). Examples of such products, which are available on the market, are products from Elotex, like Elotex AP 200.

Component (e): calcareous, silicic or silicic-calcareous fillers are commonly available known products. Fillers which may be used for cement compositions are defined in the UNI EN 206 standard. Such products are normally used to obtain a greater resistance, a lower porosity and a reduced efflorescence. The filler may also be selected among the mineral additions, e.g. metacaolin, $SiO_2$ and mixtures thereof.

Component (f): any substance capable of oxidizing/decomposing environment polluting substances it comes into contact with, in the presence of light and humidity may be used as a photocatalyst. The term "environmental pollutants" indicates for instance organic pollutants such as aromatic polycondensates, aldehydes, benzene, carbon black comparable to PM10, and inorganic pollutants such as nitrogen oxides ($NO_x$) and sulphur oxides ($SO_x$) and carbon monoxide (CO). The pollutants which are oxidized/decomposed by the photocatalytic activity are then removed from the surface by the washing action of rain or by periodical washings.

The preferred photocatalyst is titanium dioxide ($TiO_2$), at least partially in the form of anatase, or its precursor. The expression "at least partially in the form of anatase" means that the particles of titanium dioxide have an anatase structure by at least 5%, preferably 25%, more preferably at least 50%, even more preferably at least 70%, as mass percentages with respect to the titanium dioxide total. In a particularly preferred aspect of the invention, titanium dioxide has a 100% anatase structure. The titanium dioxide particles display a specific surface preferably in the range between 15 and 350 $m^2/g$. An example of $TiO_2$ that meets the above said requirements is $TiO_2$ PC 105 and PC 500 which is marketed by "Millennium Inorganic Chemical".

The expression "precursor of titanium dioxide" refers to any product that may form the above said $TiO_2$ with appropriate chemical or physical treatments. An example of $TiO_2$ precursor is the so-called "titanium paste". In the compositions according to the invention, $TiO_2$ may be combined with appropriate atoms such as Fe(III), Mg(II), Mo(V), Ru(III), Os(III), Re(V), V(IV) and Rh(III). Specifically, these atoms may replace, at an atomic level, the Ti(IV) present in the matrix of the $TiO_2$ by at least 0.5% (in mass) with respect to total titanium dioxide ($TiO_2$).

The method of obtaining photocatalysts based on titanium dioxide is disclosed in the literature, for instance in J. Phys. Chem. 1994, 98, 1127-34, Angew. Chemie 1994, 1148-9 and in Angew. Chemie Int., Ed. 1994, 33, 1091 and in patent WO 01/00541 to the Applicant.

The above said ingredients (a)-(f) are preferably present in the compositions which are the object of the invention in the following concentrations:
(a): from 15 to 65%, more preferably from 35 to 45%
(b): from 0.5 to 3%, more preferably from 1 to 2%
(c) from 0.05 to 1%, more preferably from 0.1 to 0.4%
(d): from 0.05 to 3%, more preferably from 0.5 to 1.5%
(e): from 15 to 65%, more preferably from 33 to 43%
(f): from 0.05 to 2%, more preferably from 0.8 to 1.6%.

The percentages (a)-(f) indicate weight percentages with respect to the total weight of the composition.

The photocatalyst may be used as a separate ingredient or, when a photocatalytic binder is used as component (a), the photocatalyst is already contained in the cement itself; in the latter case the binder (a) contains the photocatalyst in percentages preferably in the range between 0.12% and 5%, more preferably between 2 and 4%, calculated as a mass with respect to the binder (a). Examples of photocatalytic cements are the products of the TX range (Italcementi), such as TX Arca®, TX Aria®.

The above defined compositions may also optionally contain further additives which are commonly used in cement compositions. Air entraining agents, pigments, antifoams etc. may be mentioned by way of no limitation.

The above said compositions may be obtained by simply mixing the respective components in any order. The photocatalyst may be added to the different components of the mixture or it may already be present in the used binder (photocatalytic cement). The various solid components are preferably mixed with one another in a dry state in an appropriate mixer (e.g. a planetary mixer) for a time (for instance 3 minutes) required to obtain a good homogenization. The order, by which the different solids components are added, makes no difference. Water is therefore added in the required proportions and the mixing is continued for the needed time (e.g. 2 minutes) to obtain a fluid and homogeneous mortar, useful as a photocatalytic coating. The mortar is obtained by adding water in appropriate proportions to the above defined compositions; for this purpose, a water/binder ratio generally in the range between 0.2 and 0.8 is used, where binder indicates the hydraulic binder (a) present in the composition. The above said mortars may be defined and used as paints, renders or plasters, in relation to the water content and to the granulometry of the existing components: in the case of paints, the water/binder ratio is generally in the range between 0.3 and 0.8 with a granulometry of the dry mixture <0.3 mm; in the case of renders, the water/binder ratio is generally in the range between 0.2 and 0.6 with a granulometry of the dry mixture <0.6 mm; in the case of plasters, the water/binder ratio is generally in the range between 0.2 and 0.6 with a granulometry of the dry mixture of about 1 mm. The compositions according to the invention may be applied in layers having a variable thickness, depending on the need; the thickness is generally in the range between 1 and 20 mm. The application is generally carried out by means of a spatula or equivalent means (e.g. plastering trowel). To increase its specific air contact surface, the surface of the applied layer may be roughened by appropriate surface treatments on the composition when still wet or already consolidated. Items coated on the surface with the above said photocatalytic compositions are a further object of the invention. Examples of such items are paving elements such as e.g. tiles, blocks of stone, slabs and road and pavement surfaces in general. Other examples are wall structures, fronts of buildings, monuments, plates and memorial tablets, stairways, fountains, benches and other architectural and/or street furniture elements.

A further aspect of the invention is a method of cutting down environmental pollutants, characterized in the exposure of the environment requiring such a treatment to an item coated with the previously disclosed compositions. The photocatalytic activity further allows to decompose the different kinds of polluting particles which deposit on the surface of the item: accordingly, the surface remains more protected from undesired changes of color, with the prolonged retention of the starting values of brightness, dominant wavelength, color pureness in the course of time, according to the definitions given e.g. in WO98/05601: taken together, these effects are briefly defined as "color durability".

All of the compositions according to the invention have met the criteria of optimal rheology, with a performance equivalent or sometimes better than those according to the reference known art. Furthermore, surprisingly, the present combination of ingredients resulted in a strong synergic effect in increasing the activity of the photocatalyst. Indeed, as set forth in the experimental part, the compositions according to the invention have shown to unexpectedly be more active, with a considerably higher photocatalytic power with respect to the reference compositions, when using the same quality and quantity of photocatalyst.

The invention has therefore achieved the aim of providing a photocatalytic composition with an optimal rheology, which may easily be applied and does not drip, by using a limited number of components; a first saving factor is therefore obtained which is related to a simpler formulation. Furthermore, in virtue of the increased photocatalytic power, the compositions may be exploited as a more powerful product; as an alternative, the concentration of photocatalyst may be reduced and therefore, proportionally, the cost of the product, even retaining a photocatalytic power equivalent to the already known compositions.

By way of non-limitative example, some examples related to the preparation and showing the features of the invention are set forth hereinafter.

EXPERIMENTAL PART

The rheologic behavior of mixtures according to the invention (and of reference mixtures) subjected to mechanical stress has been evaluated according to two parameters representative respectively of:
(i) the time of application of the mixture to the substrate by means of leveling, and
(ii) the time following the application, in which the mixture is left wet on a vertical surface.

The representative parameter of time (i) is "high rate gradient viscosity", where the gradient is generally in the range between $10^2 \, s^{-1}$ and $10^4 \, s^{-1}$. This gradient is on average that occurring when mortars are applied in a layer in the range between 0.05 mm and 5 mm at a typical application rate of 0.5 m/s.

The representative parameter of time (ii) is the "low shear stress viscosity", where the shear stress is in the range between $5 \times 10^{-1}$ Pa and 5 Pa. This stress is on average the stress the mortar is subjected to when wet, after being applied on a vertical surface.

The apparatus used for the experiments is a controlled-stress rotational rheometer (AR1000-N) from TA Instruments (using a blade geometry of the "vane" type) and the procedure used for the experiments was as follows:
1. Preparing the mortar (mixing powders and adding water); total mixing time 2 minutes.
2. Loading the sample and stressing the sample at a speed of $100 \, s^{-1}$ for 10 minutes.
3. Applying the speed gradient from $10^2 \, s^{-1}$ to $10^4 \, s^{-1}$.
4. Stressing the sample at a speed of $100 \, s^{-1}$ for 10 minutes.
5. 4 minute pause (sample not stressed).

Application of a shear stress equivalent to $5 \times 10^{-1}$ Pa and 5 Pa.

Compositions have therefore been defined according to rheology as follows:
optimal (***): compositions with (i) <10 Pa s, (ii) >1000 Pa s
average (**): compositions with (i) 10-100 Pa s, (ii) 10-1000 Pa s
poor (*): compositions with (i) >100 Pa s, (ii) <10 Pa s All of the compositions with values of (i)/(ii) in the ranges (*)/(), or ()/(*) have also been classified as "average" (**);
all of the compositions with values of (i)/(ii) in the ranges (*)/(*), or (*)/(*) have also been classified as "poor" (*).

The values defined above for optimal mixtures (***) correspond to a very low viscosity (such as to require a limited effort by the user in the step of applying) and at the same time to a good adhesion to the surface (such as to avoid dripping phenomena after application).

The photocatalytic activity has been determined by means of the rhodamine test. This test method consists in monitoring the colorimetric development in the course of time under UV radiation of cement mortar samples the surface of which has been treated with an organic dye.

The irradiation is carried out with a UV lamp at a temperature of 20° C. and at a R.H. of 50-80%. The colorimetric detections are carried out at 0h, 4 h and 26 h; the detection is carried out at three different points of the surface for each sample and the average thereof is computed.

The selected organic dye is rhodamine B, deposited as an aqueous solution at a known concentration on the surface of the samples (0.05 g/l, applied in an amount of 0.023 ml/cm² of surface of the sample).

A colorimeter working according to the CIE L*a*b* system, having a D65/10° lighting with an 8° sphere geometry (measure according to the CIELAB system) is used for the colorimetric detection. In this system L* indicates brightness, whereas a* and b* are the colorimetric coordinates representing the dimension of color tone in a two-dimensional plane. Coordinate a* indicates an inclination towards red if it is in the positive part (+) or towards green if it is in the negative part (−). Coordinate b* indicates an inclination towards yellow if it is in the positive part (+) or towards blue if it is in the negative part (−). In this case, as rhodamine is red, the coordinate at issue is only a*.

For the evaluation of the photocatalytic activity, the reference parameters are:
a* (4): value of a* after a 4 h irradiation
a* (26): value of a* after a 26 h irradiation The photocatalytic activity has been expressed as follows:

| poor (*): | a* (4): = <22 | a* (26): <55 |
| average (**): | a* (4): = 22-30 | a* (26): 55-70 |
| optimum (***): | a* (4): = >30 | a* (26): >70 |

All of the compositions with values of a*(4)/a*(26) included in the ranges (*)/(), or ()/(*) have also been classified as "average" (**); all of the compositions with values of a*(4)/a*(26) included in the ranges (*)/(*), or (*)/(*) have also been classified as "poor" (*).

Example 1

A render has been prepared by using the composition set forth below:

| Component | Weight % |
| --- | --- |
| Italcementi TX cement | 39.6 |
| Calcareous filler | 38.5 |
| AP 200 (Elotex) | 1.05 |
| Culminal C4051 (Hercules) | 0.16 |
| Cimfluid Adagio P1 (Axim) | 1.2 |
| Water | 19.5 |

The TX cement used in all of the examples 1-9 contains a uniform percentage of $TiO_2$ equivalent to 3% in weight.

All of the components in a powder phase have been mixed in a planetary mixer of the Hobart type for 3 minutes in order to obtain a good homogenization of the powders; water has then been added and the mixing has been continued for another 2 minutes.

The rheologic measurements carried out on the wet mortar have shown an optimal (*) rheology of the mixture and an optimal (*) photocatalytic activity of the samples manufactured with this mortar.

Example 2

A render has been prepared by using the composition set forth below:

| Component | Weight % |
| --- | --- |
| Italcementi TX cement | 39.6 |
| Calcareous filler | 38.5 |
| AP 200 (Elotex) | 1.05 |
| Tylose MH60004 P6 ((Clariant) | 0.23 |

-continued

| Component | Weight % |
|---|---|
| Cimfluid Adagio P1 (Axim) | 1.2 |
| Water | 19.5 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown an optimal rheologic evaluation (*) whereas the samples manufactured with this mortar have shown an optimal photocatalytic activity (*).

Example 3 (Reference)

A render has been prepared by using the composition set forth below:

| Component | Weight % |
|---|---|
| Italcementi TX cement | 39.6 |
| Calcareous filler | 38.4 |
| AP 200 (Elotex) | 1.05 |
| HEC (Lamberti) | 0.16 |
| Cimfluid Adagio P1 (Axim) | 1.2 |
| Water | 19.6 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown a poor (*) rheology of the mixture whereas an optimal (***) photocatalytic activity of the samples manufactured with this mortar has been noted.

Example 4 (Reference)

A render has been prepared by using the composition set forth below:

| Component | Weight % |
|---|---|
| Italcementi TX cement | 39.6 |
| Calcareous filler | 38.5 |
| AP 200 (Elotex) | 1.05 |
| CMC Blanose (Hercules) | 0.16 |
| Cimfluid Adagio P1 (Axim) | 1.2 |
| Water | 19.5 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown a poor (*) rheology of the mixture and an average (**) photocatalytic activity of the samples manufactured with this mortar has been noted.

Example 5

A render has been prepared by using the composition set forth below:

| Component | Weight % |
|---|---|
| Italcementi TX cement | 39.4 |
| Calcareous filler | 38.3 |
| AP 200 (Elotex) | 1.05 |
| Culminal C4045 (Hercules) | 0.16 |
| Meflux 1641 (Degussa) | 1.2 |
| Water | 19.9 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown an optimal (*) rheologic evaluation and an optimal (*) photocatalytic activity of the samples manufactured with this mortar has been noted.

Example 6

A render has been prepared by using the composition set forth below:

| Component | weight % |
|---|---|
| Italcementi TX cement | 39.4 |
| Calcareous filler | 38.3 |
| AP 200 (Elotex) | 1.05 |
| MKX40000PP01 (Walocel) | 0.16 |
| Meflux 1641 (Degussa) | 1.2 |
| Water | 19.9 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown an optimal (*) rheology of the render and an optimal (*) photocatalytic activity of the samples manufactured with this mortar has been noted.

Example 7 (Reference: EP-A-885 857)

A render has been prepared according to the teachings in EP-A-885 857 by using the composition set forth below:

| Component | Weight % |
|---|---|
| Italcementi TX cement | 39.4 |
| Calcareous filler | 38.3 |
| AP 200 (Elotex) | 1.05 |
| Methocell 228 (Dow Chemical) | 0.16 |
| Melment F10 (Degussa) | 1.6 |
| Amilotex 8100 (Hercules) | 0.016 |
| Water | 19.4 |

All of the components in a powder phase have been mixed in a planetary mixer of the Hobart type for 3 minutes in order to obtain a good homogenization of the powders and water has then been added and the mixing has been continued for another 2 minutes. The rheologic measurements carried out on the wet mortar have shown an optimal (***) rheology whereas a poor (*) photocatalytic activity of the samples manufactured with this mortar has been noted.

Example 8 (Reference)

A render has been prepared by using the composition set forth below:

| Component | Weight % |
|---|---|
| Italcementi TX cement | 39.4 |
| Calcareous filler | 38.3 |
| AP 200 (Elotex) | 1.05 |
| Methocell 228 (Dow Chemical) | 0.16 |
| Melment F10 (Degussa) | 1.6 |
| Water | 19.4 |

All of the components in a powder phase have been mixed in a planetary mixer of the Hobart type for 3 minutes in order to obtain a good homogenization of the powders and water has then been added and the mixing has been continued for another 2 minutes. The rheologic measurements carried out on the wet mortar have shown a poor (*) rheology of the mixture and a poor (*) photocatalytic activity of the samples manufactured with this mortar.

Example 9 (Reference)

A render has been prepared by using the composition set forth below:

| Component | Weight % |
|---|---|
| Italcementi TX cement | 39.4 |
| Calcareous filler | 38.5 |
| AP 200 (Elotex) | 1.05 |
| Melment F10 (Degussa) | 1.6 |
| Amilotex 8100 (Hercules) | 0.05 |
| Water | 19.4 |

All of the components in a powder phase have been mixed in a planetary mixer of the Hobart type for 3 minutes in order to obtain a good homogenization of the powders and water has then been added and the mixing has been continued for another 2 minutes.

The rheologic measurements carried out on the wet mortar have shown a poor (*) rheology and an average (**) photocatalytic activity of the samples manufactured with this mortar has been noted.

The results which have been obtained above are summarized in the following table:

| Example | Type of cellulose | Cellulose Viscosity | Superfluidifying agent | Starch | Rheologic result | Photocatalytic result |
|---|---|---|---|---|---|---|
| 1 (inv.) | Methylhydroxymethyl cellulose (Culminal C4051) | 65000 85000 | Acrylic (Cimfluid Adagio P1) | NO | *** | *** |
| 2 (inv.) | Methylhydroxymethyl cellulose (Tylose MH60004P6) | 27000 34000 | Acrylic (Cimfluid Adagio P1) | NO | *** | *** |
| 3 (rif.) | Hydroxyethylcellulose (HEC Lamberti) | 2500 | Acrylic (Cimfluid Adagio P1) | NO | * | *** |
| 4 (rif.) | Carboxymethyl cellulose (Hercules CMC) | 3000 5000 | Acrylic (Cimfluid Adagio P1) | NO | * | ** |
| 5 (inv.) | Methylhydroxymethyl cellulose (Culminal C4045) | 38000 51500 | Acrylic (Melflux 1641 F) | NO | *** | *** |
| 6 (inv.) | Methylhydroxymethyl cellulose (Walocel MKX40000PP01) | 40000 50000 | Acrylic (Melflux 1641 F) | NO | *** | *** |
| 7 (rif.) | Hydroxypropylmethyl cellulose (Methocel 228) | 3800 | Sulphonated melamine (Melment F10) | Etherified starch (Amilotex 8100) | *** | * |
| 8 (rif.) | Hydroxypropylmethyl cellulose (Methocel 228) | 3800 | Sulphonated melamine (Melment F10) | NO | * | * |
| 9 (rif.) | No | | Sulphonated melamine (Melment F10) | Etherified starch (Amilotex 8100) | * | ** |

From the data obtained it may be noted that the compositions object of the invention have shown an optimal profile as far as both rheology and photocatalytic activity are concerned. Vice versa, none of the reference compositions have combined the two optimal values, thus showing average or poor values for the rheologic and/or photocatalytic component. Furthermore, the present compositions have obtained a substantial increase in photocatalytic activity with an equivalent percentage of photocatalyst as compared to the known art in EP 885 857 (example 7) already characterized by appropriate rheologic features.

The invention claimed is:

1. A photocatalytic coating composition comprising:
   (a) a hydraulic binder;
   (b) a polycarboxylic or acrylic superfluidifying agent;
   (c) a cellulose ether;
   (d) an adhesive agent;
   (e) a calcareous, silica or silica-calcareous filler;
   (f) a photocatalyst
   wherein the superfluidifying agent (b) is polycarboxylic or acrylic, the cellulose ether (c) has a viscosity in a range between 10000 and 120000 mPa·s and the photocatalytic composition is free of starch.

2. A composition according to claim 1, wherein the photocatalyst (f) is titanium dioxide at least partially in the form of anatase, or a precursor thereof.

3. A composition according to claim 1, wherein the photocatalyst (f) is titanium dioxide in the form of anatase by at least 70% in mass with respect to total titanium dioxide.

4. A composition according to claim 1, wherein the cellulose ether (c) has a viscosity in the range between 20000 and 90000 mPa·s and is selected from the group consisting of methylhydroxymethylcellulose, ethylcellulose, hydroxypropylcellulose, hydroxypropylmethylcellulose, methylcellulose, carboxymethylcellulose, and methylcarboxyethylcellulose.

5. A composition according to claim 1, wherein the adhesive agent (d) is a vinyl or acrylic polymer.

6. A composition according to claim 1 having the following percentage by weight with respect to the total composition:
   (a): from 15 to 65%,
   (b): from 0.5 to 3%,
   (c): from 0.05 to 1%,
   (d): from 0.05 to 3%,
   (e) from 15 to 65%,
   (f) from 0.05% to 2%.

7. A composition according to claim 6 having the following percentage by weight with respect to the total composition:
   (a): from 35 to 45%,
   (b): from 1 to 2%,
   (e) from 0.1 to 0.4%,
   (d): from 0.5 to 1.5%,
   (e): from 33 to 43%,
   (f) from 0.8 to 1.6%.

* * * * *